United States Patent [19]

Mahon

[11] Patent Number: 4,628,592
[45] Date of Patent: Dec. 16, 1986

[54] METHOD OF ASSEMBLING A MOTOR SPEED REDUCER TO A DEVICE TO BE DRIVEN

[75] Inventor: Joseph J. Mahon, Libertyville, Ill.

[73] Assignee: Eaton Corporation, Cleveland, Ohio

[21] Appl. No.: 848,837

[22] Filed: Apr. 3, 1986

Related U.S. Application Data

[63] Continuation of Ser. No. 629,856, Jul. 11, 1984, abandoned.

[51] Int. Cl.[4] .............................................. H02K 15/00
[52] U.S. Cl. ........................................ 29/596; 310/42; 310/71; 310/83
[58] Field of Search ...................... 29/596; 310/42, 83, 310/71

[56] References Cited

U.S. PATENT DOCUMENTS

| 4,152,612 | 5/1979 | Grah et al. | 310/83 |
| 4,250,420 | 2/1981 | Endo | 310/83 |

Primary Examiner—Carl E. Hall
Attorney, Agent, or Firm—C. H. Grace; R. A. Johnston

[57] ABSTRACT

A plug-in power transmission assembly having a housing with a gear train and with a motor mounted on one side and the output drive shaft extending from the opposite side. The motor has connectors thereon which are received through guides on the housing and extend outwardly in a common direction with the output shaft axis. Releasable fastening means are provided on the output shaft side of the housing. The assembly, as a unit is plugged into a device to be driven and the output shaft, electrical connectors and fastening means are simultaneously engaged.

3 Claims, 3 Drawing Figures

U.S. Patent  Dec. 16, 1986  4,628,592
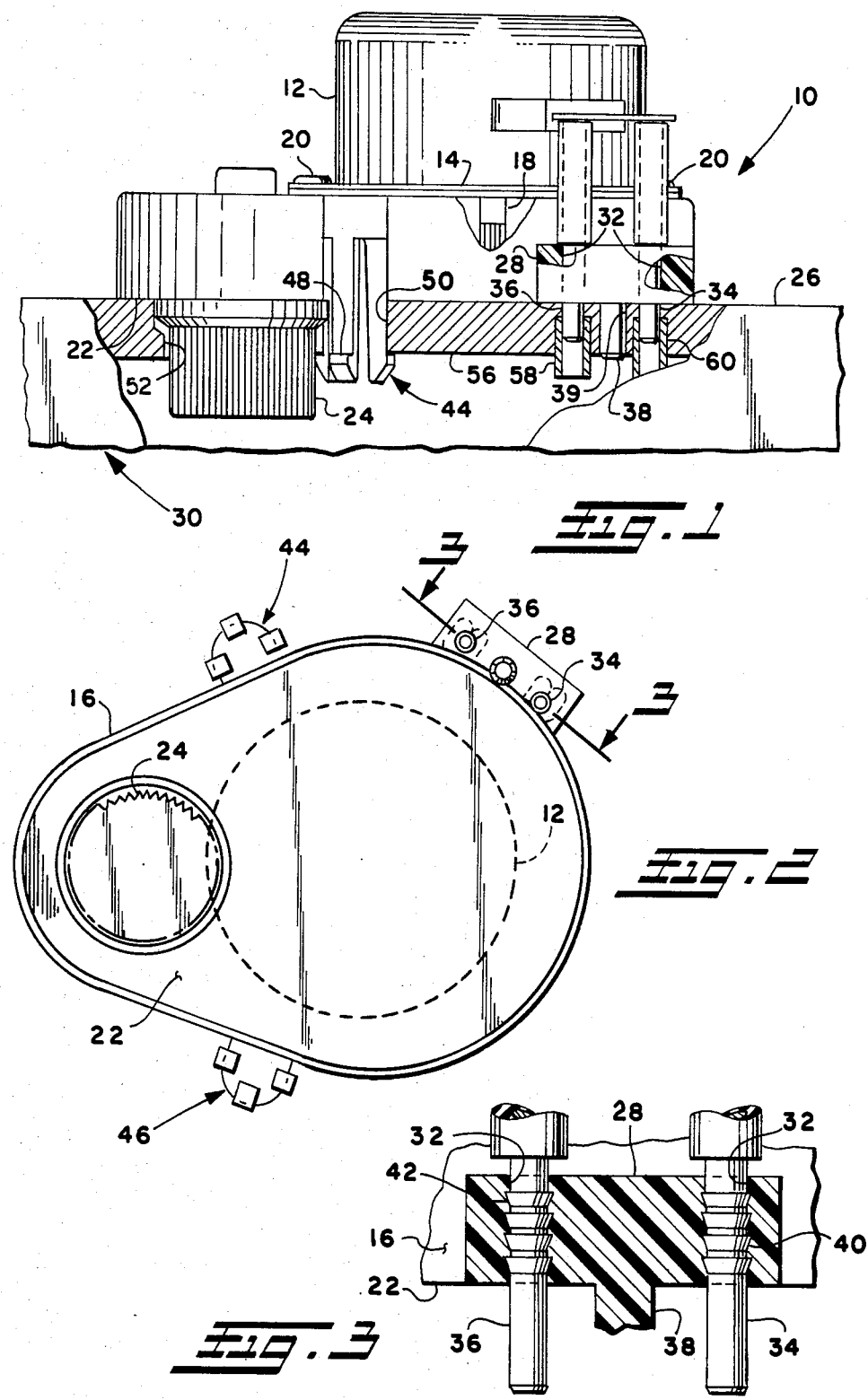

METHOD OF ASSEMBLING A MOTOR SPEED REDUCER TO A DEVICE TO BE DRIVEN

This application is a continuation of application Ser. No. 629,856, filed July 11, 1984, now abandoned.

BACKGROUND OF THE INVENTION

The present invention relates to motorized drives for timing control devices and in particular relates to timer/controllers employing small subfractional horse power timing motors. Small synchronous timing motors are typically used with a speed reducer for driving timer/controllers or programmer timers as they are sometimes referred to, employed for service cycle control of domestic appliances such as clothes dryers, washing machines and microwave cooking ovens.

In the design of appliances of the aforesaid type employing a timing motor and speed reducer, the motor and speed reducer subassembly drivingly engages a series of cam wheels for sequentially actuating and deactuating electrical switches for controlling various appliance electrical functions.

In known programmer timers for appliances, heretofore it has been the practice to provide a suitable common housing or casing for the cam actuating mechanism and switches and to attach the separate motor and speed reducer thereto with suitable fastening techniques. Typically, the speed reducer mechanism is assembled onto the switch housing and the motor is then fastened thereto. In such known programmer timers, the switches and cam mechanism are usually assembled onto the opposite side of the housing and suitable electrical terminals for the switches provided for connecting the motor leads and switches thereto. This type of programmer timer assembling arrangement has required numerous positioning and assembly operations which have proven to be costly in high volume manufacturing.

It has, therefore, long been desired to provide a technique for assembling a motor and speed reducer to a cam actuated switch programmer in a manner which permits rapid and inexpensive modular assembly during manufacturing.

SUMMARY OF THE INVENTION

The present invention provides a compact motor driven power transmission module adapted for plug-in assembly to a programmer controller device for providing a constant speed power input to the device.

The present invention employs a gear case having the motor received thereon preferably on one side with the power output shaft extending from the opposite side. The motor itself is assembled onto the gear case in plug in fashion with rigid electrical leads formed on the motor and extending outwardly therefrom and in the direction of the xotor shaft. The motor leads being received through guide means, provided on the gear case for extending outwardly from the opposite side in the direction of the gear output shaft.

Releasable fastening means, preferably of the bayonet quick-lock type, are provided on the gear casing extending generally in the direction of the gear output shaft. The gear casing, with the motor attached, is then plugged in as a single module to the programmer/timer device to be driven with the gear output shaft mechanically engaging means to be driven. Simultaneously, as the gear output shaft mechanically engages the means to be driven, the motor leads enter the suitable electrical receptacles provided on the timer device and the fastening means snap-locks on the timer device to retain the motor gear box module thereon.

The present invention thus provides a unique motor speed reducer subassembly, which can be readily plugged into and snap-locked to a device to be driven for providing mechanical engagement for power transmission to the device and with electrical connection for the motor.

BRIEF DESCRIPTION OF THE DRAWINGS

FIG. 1 is a side view in elevation of the power transmission module of the present invention shown installed on a device to be driven portions of which are broken away for clarity;

FIG. 2 is a bottom view of the module of FIG. 1 with the device to be driven omitted for clarity; and, FIG. 3 is a section view taken along section indicating lines 3—3 of FIG. 2.

DETAILED DESCRIPTION

Referring now to FIGS. 1 and 2, the power transmission module is indicated generally at 10 with a motor 12 preferably of the synchronous permanent magnet type having a mounting flange 14. The motor is received on a gear case or housing 16 with the motor output shaft 18 received in the gear case in mechanical engagement with the input gear (not shown) thereof. The motor flange 14 is retained against the gear case by a suitable fastening expedient as, for example, heat deformed plastic rivets 20 received through the flange 14.

The side 22 of the gear case opposite the motor has extending therefrom an output pinion 24 for driving engagement with the device to be driven, indicated generally at 30, which has a surface 26 upon which the gear case surface 22 is mounted in contact therewith. The gear case 16 has a terminal guide lug 28 extending therefrom and disposed adjacent the surface 22 and has a pair of apertures 32 formed therethrough.

The motor 12 has a pair of electrical terminals 34, 36 extending outwardly and downwardly therefrom. Each of the terminals is received, respectively, through one of the apertures 32 and extends outwardly therefrom generally at right angles to the side 22 of the gear case. The portion of the terminals between the lug 28 and the motor 12 is preferably provided with suitable insulation.

Referring now to FIG. 3, the lug 28 is shown in enlarged cross section, wherein the guide pin portion 38 formed preferably integrally therewith and extending downwardly therefrom is clearly illustrated. The guide pin portion 38 engages a corresponding guide hole 39 formed in the device 30 for aligning and positioning the gear case 16 against the surface 26 of the device 30.

The electrical terminals 34, 36 each have barbs, indicated respectively, at 40, 42 provided thereon for engaging the wall of one of the holes 32 for resisting removal from the direction of insertion, or push loads directed upwardly on the ends of the pin, as shown in FIG. 3.

Referring to FIGS. 1 and 2, the fastening means for the module 10 is illustrated in the form of a plurality of barbed prongs disposed in sets indicated generally at 44, 46 disposed on opposite sides of the gear case 16. Each set of prongs 44, 46 preferably comprises a plurality of barbed prongs extending from the side wall of the gear case downwardly in a direction generally parallel to the axis of pinion 24. With reference to FIG. 1, the set 44 of barbed prongs comprises three prongs extending in generally spaced parallel relationship with barbed tips 48 provided thereon for snap locking engagement with the wall of device 30 when the barbs are received in a hole 50 provided in the surface 26 of the device to be driven.

It will be understood that, for assembly, the module 10 is positioned over the surface 26 of the device 30 to be driven, pinion 24 is inserted to a suitable clearance hole 52 provided in the device to be driven, simultaneously the guide pin 38 is engaged in a locating hole 39 and barbs 44 and 46 enter holes provided therefor as shown typically at 50 in FIG. 1. As the module 10 is further moved to engagement with the surface 26 of a device to be driven, barbed prongs 44, 46 snap-lock to engage the undersurface 56 of the device to be driven; and, terminals 34, 36 engage suitable electrical receptacles shown as tubular connectors 58, 60 provided in device 30. The receptacles 58, 60 function to supply electrical power to the motor 12.

The pinion 24 provides mechanical power from the module 10 to the device 30 to be driven by engagement with the teeth of pinion 24. The module 10 is shown in the fully operationally installed position in FIG. 1 with the side 22 of gear case 16 in contact with surface 26 of a driver 30. It will be understood that, if it is required to remove the module 10 from assembly with the device 30, it is necessary to have access to the tips of the barbs 44, 46 to compress the barbs for release through the engagement hole such as hole 50.

The present invention thus provides a plug-in power transmission module for attachment to a device to be driven such as a programmer/controller, and which may be installed with a simple push-in snap-locking engagement. The present invention provides simultaneous connection of a driving gear pinion, motor electrical connector terminals and snap locking fastening means for retaining the module in its operating position.

Although the invention has hereinabove been described with reference to the illustrated embodiment, it will be understood that the invention is capable of modification and variation by those of ordinary skill in the art within the scope of the following claims.

I claim:

1. A method of assembling a motor gear drive with device to be driven, comprising the steps of:
    (a) providing a gear box with electrical terminal guide means and having a power output shaft extending from one side thereof and a power input shaft connection provided on the opposite side thereof;
    (b) providing a motor having a motor shaft extending therefrom and a pair of electrical terminals extending therefrom in the direction of the motor shaft;
    (c) inserting said motor shaft into said gear box and engaging said motor shaft with said power input connection and inserting said electrical terminals in the direction of said motor shaft into said guide means all in a common direction; and,
    (d) inserting said power output shaft into engagement with a device to be driven and simultaneously in a common direction therewith, inserting said terminals into electrical power source connection on said device.
2. A method of assembling a motor drive comprising:
    (a) providing a motor speed reducer in a housing with an output shaft engageable from one side thereof;
    (b) extending electrical connector means in the direction of said output shaft from said one side of said housing;
    (c) extending releasable fastening means from said housing means one side; and,
    (d) inserting substantially simultaneously, in the direction of said output shaft, said output shaft, said connector means and said fastening means into a device to be driven and operatively engaging each of said means with said device for transmitting electrical power to said motor means and mechanical power to said device and securing said motor speed reducer to said device.
3. The method defined in claim 2, wherein the step of extending said connector means from said one side includes the steps of inserting a motor onto said housing and simultaneously inserting said electrical connector means through guide means on said housing.

* * * * *